(12) United States Patent
Fischer et al.

(10) Patent No.: US 11,220,557 B2
(45) Date of Patent: Jan. 11, 2022

(54) METHOD AND SYSTEM FOR POLYMERIZING ACRYLATES

(71) Applicant: INEOS STYROLUTION GROUP GMBH, Frankfurt am Main (DE)

(72) Inventors: Wolfgang Fischer, Walldorf (DE); Peter Ittemann, Dannstadt-Schauernheim (DE); Florian Patcas, Ludwigshafen (DE); Michael Ruf, Schwetzingen (CZ)

(73) Assignee: INEOS STYROLUTION GROUP GMBH, Frankfurt am Main (DE)

( * ) Notice: Subject to any disclaimer, the term of this patent is extended or adjusted under 35 U.S.C. 154(b) by 387 days.

(21) Appl. No.: 16/330,208

(22) PCT Filed: Sep. 5, 2017

(86) PCT No.: PCT/EP2017/072167
§ 371 (c)(1),
(2) Date: Mar. 4, 2019

(87) PCT Pub. No.: WO2018/046470
PCT Pub. Date: Mar. 15, 2018

(65) Prior Publication Data
US 2019/0225713 A1 Jul. 25, 2019

(30) Foreign Application Priority Data
Sep. 6, 2016 (EP) .................................... 16187329

(51) Int. Cl.
*C08F 2/01* (2006.01)
*B01J 19/24* (2006.01)
(Continued)

(52) U.S. Cl.
CPC ............. *C08F 2/01* (2013.01); *B01J 19/0053* (2013.01); *B01J 19/18* (2013.01); *B01J 19/2425* (2013.01);
(Continued)

(58) Field of Classification Search
USPC ............................................ 526/67; 422/138
See application file for complete search history.

(56) References Cited

U.S. PATENT DOCUMENTS 3,825,512 A 7/1974 Reiter et al.
3,891,603 A 6/1975 Heil et al.
(Continued)

FOREIGN PATENT DOCUMENTS

EP 0865820 A1 3/1998
EP 1297038 B1 8/2006
(Continued)

OTHER PUBLICATIONS

English translation of Search Report in corresponding Chinese Application No. 201780054834.2, dated Dec. 9, 2020.
(Continued)

*Primary Examiner* — Fred M Teskin
(74) *Attorney, Agent, or Firm* — J.A. Lindeman & Co. PLLC; Aaron Raphael

(57) ABSTRACT

The invention relates to a method for polymerizing acrylates using a reactor (50). Reaction heat produced in the reactor (50) is discharged via a boiling cooler (40) in that gaseous vapors produced in the reactor (50) are supplied to the boiling cooler (40), and condensed vapors are returned to the reactor (50) from the boiling cooler (40). At least one component containing acrylate is at least partly added via the boiling cooler (40) and reaches the reactor (50) via the boiling cooler (40). The invention additionally relates to a system for polymerizing an acrylate, comprising a reactor
(Continued)

(50) and a boiling cooler (40) for discharging reaction heat produced in the reactor (50). The boiling cooler (40) has at least one filling opening (46) for supplying at least one component containing acrylate.

16 Claims, 1 Drawing Sheet

(51) Int. Cl.
| | |
|---|---|
| *C08F 2/04* | (2006.01) |
| *C08F 265/06* | (2006.01) |
| *B01J 19/18* | (2006.01) |
| *C08F 220/18* | (2006.01) |
| *C08L 51/04* | (2006.01) |
| *B01J 19/00* | (2006.01) |
| *C08F 220/10* | (2006.01) |
| *C08F 291/02* | (2006.01) |
| *C08F 279/04* | (2006.01) |

(52) U.S. Cl.
CPC .............. *C08F 2/04* (2013.01); *C08F 220/10* (2013.01); *C08F 220/18* (2013.01); *C08F 265/06* (2013.01); *C08F 291/02* (2013.01); *C08L 51/04* (2013.01); *B01J 2219/00094* (2013.01); *B01J 2219/00103* (2013.01); *B01J 2219/00128* (2013.01); *B01J 2219/00162* (2013.01); *C08F 279/04* (2013.01)

(56) References Cited

U.S. PATENT DOCUMENTS

| | | | |
|---|---|---|---|
| 4,224,419 A | * | 9/1980 | Swoboda .............. C08F 265/04 |
| | | | 525/71 |
| 4,555,384 A | | 11/1985 | Morris et al. |
| 4,657,994 A | | 4/1987 | Tanaka et al. |
| 5,196,480 A | * | 3/1993 | Seitz ....................... C08L 25/12 |
| | | | 525/71 |
| 6,428,199 B1 | | 8/2002 | Rupaner et al. |
| 2002/0176812 A1 | * | 11/2002 | Takai ..................... C08F 210/02 |
| | | | 422/131 |
| 2016/0297957 A1 | | 10/2016 | Boeckmann et al. |
| 2017/0145201 A1 | | 5/2017 | Boeckmann et al. |

FOREIGN PATENT DOCUMENTS

| | | |
|---|---|---|
| WO | 2015/078751 A1 | 6/2015 |
| WO | 2015/150223 A1 | 10/2015 |

OTHER PUBLICATIONS

Handbook of Raw Materials and Equipment for Rubber Industry, Beijing Institute of Technology Press, Published Nov. 30, 2016.
Huiju ZHOU, Comprehensive Dictionary of New Materials, Published Jun. 30, 1996.
English translation of International Preliminary Report on Patentability in International Application No. PCT/EP2017/072161, dated Mar. 21, 2019.

* cited by examiner

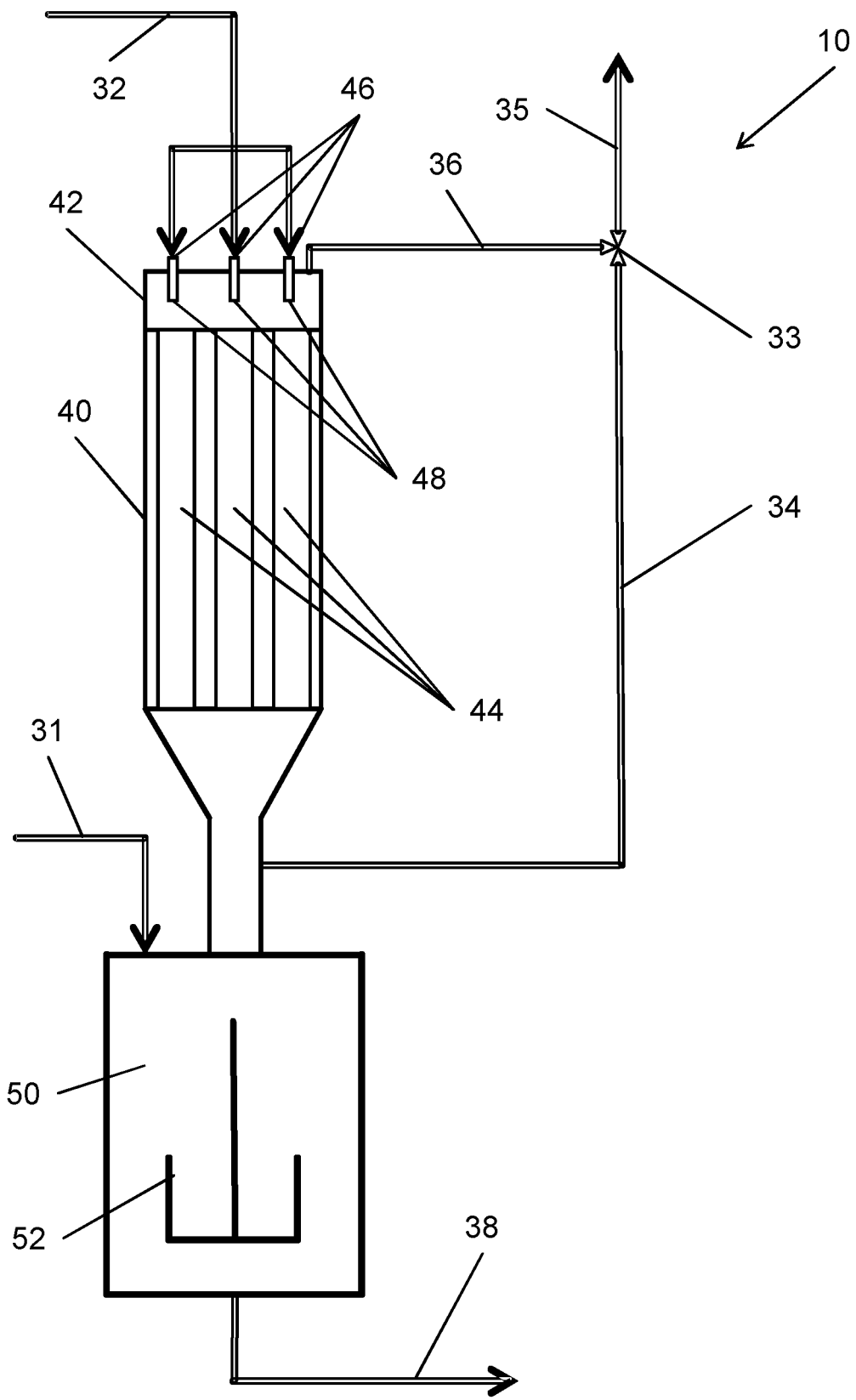

METHOD AND SYSTEM FOR POLYMERIZING ACRYLATES

SUMMARY OF THE INVENTION

The invention relates to a process for polymerizing acrylates by means of a reactor, where heat of reaction arising in the reactor is removed by means of an evaporative cooler by feeding gaseous vapor formed in the reactor to the evaporative cooler and recirculating condensed vapor from the evaporative cooler to the reactor. The invention also relates to a system for polymerizing an acrylate (preparing a polyacrylate), which comprises a reactor and an evaporative cooler for removing heat of reaction arising in the reactor.

BACKGROUND OF THE INVENTION

Polymerizing acrylates, in particular n-butyl acrylate, in a reactor which has a stirrer is known. Such a reactor is also referred to as "CSTR" (continuous stirred tank reactor) in the literature. Here, at least one component containing at least one acrylate, i.e. a monomer, is fed to the reactor and a polymerization then takes place within the reactor.

A reactor for polymerizations is disclosed, for example, in EP-A 0865820. The reactor comprises a lid, a bottom and a stirrer. The reactor comprises feed conduits via which the components are fed to the reactor. The polymerization takes place in the reactor and the polymer formed is taken from the reactor via discharge conduits.

EP-B 1297038 discloses the preparation of rubber-like styrene copolymers such as acrylonitrile-styrene-acrylate (ASA), where the copolymers are made up of a rubber phase and a hard phase grafted onto the rubber phase. Acrylate rubbers, inter alia, are suitable as rubber phase. The rubber phase is typically produced by polymerization of acrylates and often crosslinking monomers.

The polymerization is generally an exothermic reaction, viz. heat of reaction arises and can be removed, for example, by means of an evaporative cooler. As evaporative cooler, preference is given to a shell-and-tube heat exchanger. In the evaporative cooler, the gaseous vapor formed in the reactor ascends in tubes. A coolant flows around the tubes. As a result, the vapor condenses and the condensed vapor is recirculated to the reactor.

In the preparation of the polymer in the reactor, polymer is also formed in the evaporative cooler. The polymer which forms can lead to blockages in tubes of the evaporative cooler.

The removal of the heat of reaction from the reactor is made difficult thereby. In particular, temperature control of the reactor is made difficult, which can lead to adverse effects on the product quality.

It is an object of the invention to reduce or avoid the formation of polymer product in the evaporative cooler in the polymerization of an acrylate by means of a reactor and an evaporative cooler.

This object is achieved according to the invention by a process for polymerizing an acrylate by means of a reactor and an evaporative cooler having the specific features of the claims.

DESCRIPTION OF THE INVENTION

The invention provides, in particular, a process for polymerizing acrylates by means of a reactor (50), where heat of reaction arising in the reactor (50) is removed by means of an evaporative cooler (40) by gaseous vapor formed in the reactor (50) being fed to the evaporative cooler (40) and condensed vapor being recirculated from the evaporative cooler (40) to the reactor (50), wherein at least one component containing acrylate is introduced at least partly via the evaporative cooler (40) and goes via the evaporative cooler (40) into the reactor (50).

In a generic process for polymerizing an acrylate by means of a reactor, heat of reaction arising in the reactor is removed by means of an evaporative cooler by gaseous vapor formed in the reactor being fed to the evaporative cooler and condensed vapor being recirculated from the evaporative cooler to the reactor.

According to the invention, at least one component containing acrylate (or consisting of acrylate), i.e. a monomer (monomer type), is at least partly introduced via the evaporative cooler and goes from the evaporative cooler into the reactor where the polymerization takes place. The polymerization typically occurs by means of emulsion polymerization in the aqueous phase with addition of an emulsifier and a free-radical initiator. Suitable emulsifiers and initiators are described, for example, in EP-B 1297038. In particular, an acrylate polymer, in particular a crosslinked acrylate polymer, is obtained in the form of a latex (acrylate rubber).

The acrylate polymer is preferably grafted with a further component in at least one further step. The further component contains one or more monomers, in particular selected from among styrene, acrylonitrile, methyl methacrylate.

It has surprisingly been found that the operating time in an evaporative cooler can be increased significantly when the at least one component containing acrylate is introduced at least partly via the evaporative cooler and goes from the evaporative cooler into the reactor. In processes known from the prior art, the component is introduced directly into the reactor. The operating time here is the time for which acrylate can be polymerized by means of the reactor and the evaporative cooler. The operating time in the present case ends when so much polymer has been formed in the evaporative cooler that the removal of heat by means of the evaporative cooler is so greatly hindered that the temperature control of the reactor is influenced and the polymer formed in the evaporative cooler has to be removed from the evaporative cooler.

The at least one component which is introduced into the evaporative cooler preferably contains at least one $C_1$-$C_8$-alkyl (meth)acrylate, preferably at least one $C_4$-$C_8$-alkyl (meth)acrylate, in particular preferably n-butyl acrylate and/or 2-ethylhexyl acrylate, particularly preferably exclusively n-butyl acrylate, as monomer. Here, the expression (meth)acryl, for example in the term (meth)acrylate, encompasses the corresponding acryl and/or methacryl compounds.

The at least one component is thus preferably present in liquid form and thus flows into the evaporative cooler.

In an advantageous embodiment of the invention, a further component containing at least one polyfunctional, crosslinking monomer; preferably selected from among allyl (meth)acrylate (AMA), divinylbenzene, diallyl maleate, diallyl fumarate, diallyl phthalate, triallyl cyanurate, triallyl isocyanurate and dicyclopentadienyl acrylate (DCPA); particularly preferably from among AMA and DCPA, is at least partly introduced via the evaporative cooler. A polyfunctional crosslinking monomer comprises two or more, preferably two or three, particularly preferably precisely two, ethylenic double bonds which are preferably not 1,3-conjugated. The crosslinking monomer as further component is preferably used in an amount of from 0.1 to 5% by weight, preferably from 0.5 to 3% by weight, particularly preferably from 1 to 2.5% by weight, based on the total amount of the monomers used.

As monomers, it is possible to use not only the at least one acrylate, preferably selected from among $C_1$-$C_8$-alkyl (meth)acrylates, and the polyfunctional crosslinking monomer but optionally also one or more further copolymerizable, monoethylenically unsaturated monomers as further components. For example, one or more monomers selected from among butadiene, isoprene, styrene, acrylonitrile, methyl methacrylate and vinyl methyl ether can be used.

Suitable monomers and compositions are described, for example, in WO 2015/150223 and WO 2015/078751. The monomers (components) can preferably be introduced at least partly as mixture or separately into the reactor.

In a preferred embodiment of the invention, the at least one component is introduced into the evaporative cooler at least partly from above through a cap of the evaporative cooler. The cap of the evaporative cooler is arranged in an upper region and closes the evaporative cooler off at the top. The at least one component is thus introduced under the force of gravity into the evaporative cooler and drops under the force of gravity into the evaporative cooler.

In a particularly preferred embodiment of the invention, the at least one component is at least partly introduced from above into a plurality of vertical tubes of the evaporative cooler. The vapor ascending from the reactor condenses in these tubes. The at least one component is thus introduced into the evaporative cooler in such a way that the at least one component goes into said tubes.

The gaseous vapor formed in the polymerization taking place in the reactor ascends against the force of gravity in the vertical tubes of the evaporative cooler and condenses in the evaporative cooler. The condensed vapor subsequently flows together with the at least one component under the force of gravity back into the reactor.

A reduced pressure compared to atmospheric pressure, in particular in the range from 150 mbar to 350 mbar, is preferably generated in the reactor. Here, the reactor is preferably evacuated through the evaporative cooler by means of a vacuum pump via a subatmospheric pressure conduit. When the reactor is evacuated through the evaporative cooler, a polymer from the evaporative cooler can be entrained in the direction of the vacuum pump, which can lead to blockages in the subatmospheric pressure conduit. In order to prevent this, a bypass conduit can advantageously be provided. The bypass conduit is preferably used for evacuating the reactor before the polymerization in the reactor takes place.

The polymerization of the acrylate in the reactor is preferably carried out as a discontinuous process. Such a discontinuous process is also referred to as batch process or charge process. Here, firstly all components containing monomers which are necessary for the polymerization and also further materials are introduced into the reactor either via the evaporative cooler or directly, and the polymerization of the acrylate takes place in the reactor. The conversion of the monomers here is, at least approximately, 100%. The acrylate rubber produced is taken from the reactor in its entirety, and thus discontinuously, only after the polymerization is completely finished and optionally after conclusion of an additional grafting reaction.

In an advantageous embodiment of the invention, water is also introduced into the evaporative cooler. As a result of the introduction of water into the evaporative cooler, flushing of the evaporative cooler takes place. Such flushing of the evaporative cooler additionally increases the operating time of the evaporative cooler in an advantageous manner.

The water is, in particular, introduced from above through the cap of the evaporative cooler and goes via the evaporative cooler into the reactor. The water is preferably introduced at least partly from above into a plurality of vertical tubes of the evaporative cooler.

In an advantageous embodiment of the invention, the water is introduced into the evaporative cooler at the same time as the at least one component. The water is thus introduced while the polymerization of the acrylate takes place in the reactor.

In another advantageous embodiment of the invention, the water is introduced into the evaporative cooler at a time after the at least one component. The water can, for example, be introduced while the polymerization of the acrylate in the reactor is still taking place. However, the water can be introduced only when the polymerization of the acrylate in the reactor is concluded.

In an advantageous embodiment of the invention, the at least one component is partly introduced directly into the reactor. In particular, the at least one component is introduced directly into the reactor during the start-up of the reactor.

The object is also achieved according to the invention by a system for polymerizing an (at least one) acrylate having the features of the claims. The system for polymerizing acrylates comprises, in particular, a reactor (50) and an evaporative cooler (40) for removing heat of reaction arising in the reactor (50), wherein the evaporative cooler (40) has at least one feed opening (46) for introducing at least one component containing acrylate (or consisting of acrylate). The invention also provides a polymer product (acrylate rubber or ASA) obtained using this system.

A generic system for polymerizing an acrylate comprises a reactor in which the polymerization takes place and an evaporative cooler for removing heat of reaction arising in the reactor. The reactor is connected to the evaporative cooler in such a way that heat of reaction arising in the reactor is removed via the evaporative cooler by feeding gaseous vapor formed in the reactor to the evaporative cooler and recirculating condensed vapor from the evaporative cooler to the reactor.

According to the invention, the evaporative cooler has at least one feed opening for introducing at least one component containing acrylate. The at least one component containing acrylate which is introduced into the evaporative cooler thus goes via the evaporative cooler into the reactor.

It has been found that the operating time of the evaporative cooler can be increased significantly when the at least one component is at least partly introduced through the feed opening via the evaporative cooler and goes from the evaporative cooler into the reactor. In processes known from the prior art, the component is introduced directly into the reactor.

The at least one feed opening is preferably arranged in a cap of the evaporative cooler. The cap of the evaporative cooler is arranged in an upper region and closes off the evaporative cooler at the top. The at least one component can thus be introduced from above through the cap of the evaporative cooler into the evaporative cooler and flows under the force of gravity into the evaporative cooler.

In an advantageous embodiment of the invention, nozzles are installed in the cap of the evaporative cooler. The nozzles are arranged in such a way that the at least one component introduced through the at least one feed opening is distributed from above over vertical tubes of the evaporative cooler. The vapor ascending from the reactor condenses in these tubes.

The reactor and the evaporative cooler are advantageously arranged in such a way that gaseous vapor formed in the reactor ascends against the force of gravity into the evaporative cooler, condenses there and vapor condensed in the evaporative cooler flows together with the at least one component under the force of gravity into the reactor.

Polymerized acrylate or polyacrylate, in particular acrylate rubber or polyacrylate rubber, particularly preferably a crosslinked polyacrylate rubber, can be produced advantageously by means of the process of the invention and by means of the system of the invention.

The acrylate rubber produced in this way initially does not have any graft shell. A grafted acrylate rubber can be obtained by addition and polymerization of one or more further monomers in the presence of the acrylate rubber. A grafted acrylate rubber consisting of an acrylate graft base (core) and a graft shell can preferably be obtained by means of the process of the invention. In particular, the graft shell can be obtained by polymerization of at least one ethylenically unsaturated monomer in the presence of the acrylate rubber, with the monomer being selected from among styrene, α-methylstyrene, p-methylstyrene, (meth)acrylic acid-$C_1$-$C_8$-alkyl ester, acrylonitrile, methacrylonitrile, anhydrides of unsaturated carboxylic acids (e.g. maleic anhydride, phthalic anhydride) and imides of unsaturated carboxylic acids (e.g. N-substituted maleimides such as N-cyclohexymaleimide and N-phenylmaleimide);

Preference is given to a grafted acrylate rubber being obtained by emulsion polymerization in the presence of the acrylate rubber of styrene or mixtures of styrene and at least one further monomer selected from among α-methylstyrene, p-methylstyrene and (meth)acrylic acid-$C_1$-$C_8$-alkyl ester (e.g. methyl methacrylate, ethyl methacrylate, n-butyl acrylate, t-butyl acrylate); and acrylonitrile or mixtures of acrylonitrile and at least one further monomer selected from among methacrylonitrile, anhydrides of unsaturated carboxylic acids (e.g. maleic anhydride, phthalic anhydride) and imides of unsaturated carboxylic acids (e.g. N-substituted maleimides such as N-cyclohexymaleimide and N-phenylmaleimide).

In particular, an acrylonitrile-styrene-acrylate copolymer (ASA) consisting of a core of acrylate rubber, in particular a crosslinked acrylate rubber, and a graft shell composed of styrene and acrylonitrile can be obtained by means of the process of the invention.

The graft rubber produced in this way can be mixed with further polymers, e.g. styrene-acrylonitrile copolymer (SAN), as matrix.

Embodiments of the invention will be explained in more detail with the aid of the following drawing, the following description and the claims.

BRIEF DESCRIPTION OF THE DRAWING

The figure shows a schematic sectional view of a system for polymerizing an acrylate.

A schematic sectional view of a system 10 for polymerizing an acrylate composed of at least one component is depicted in the figure. The system 10 serves, in particular but not exclusively, for producing acrylate rubber, in particular butyl acrylate rubber. The system 10 comprises a reactor 50. A polymerization of monomers fed in takes place in the reactor 50. A stirrer 52 is arranged within the reactor 50. The stirrer 52 can be driven rotationally by means of an electric motor which is not shown here. Other types of reactors 50 in which a polymerization of monomers fed in can take place can also be used.

A feed conduit 31 is connected to the reactor 50. The feed conduit 31 serves for introducing materials directly into the reactor 50. Materials which can be introduced directly into the reactor 50 via the feed conduit 31 include, in particular, water, an emulsifier and an initiator. However, components (monomers) for producing the acrylate rubber, which contain, in particular, the above-described monomers, can also partly be introduced directly into the reactor 50 via the feed conduit 31.

Furthermore, an offtake conduit 38 is connected to the reactor 50. Acrylate rubber produced in the reactor 50 can be taken off from the reactor 50 and the system 10 by means of the offtake conduit 38.

The system 10 further comprises an evaporative cooler 40. The evaporative cooler 40 serves for removing heat of reaction arising in the polymerization in the reactor 50. The evaporative cooler 40 is in the present case configured as shell-and-tube heat exchanger and comprises a plurality of vertical tubes 44. The evaporative cooler 40 is closed at the top, i.e. at an end facing away from the ground, by a cap 42. Furthermore, the evaporative cooler 40 comprises a coolant inlet which is not shown here and a coolant outlet which is likewise not shown here.

The reactor 50 is connected to the evaporative cooler 40 in such a way that the heat of reaction arising in the polymerization in the reactor 50 can be removed by means of the evaporative cooler 40. Here, gaseous vapor formed in the reactor 50 is fed to the evaporative cooler 40 and condensed vapor from the evaporative cooler 40 flows back into the reactor 50.

Within the evaporative cooler 40, the gaseous vapor formed in the reactor 50 ascends in the vertical tubes 44. A coolant flows around the tubes 44. The coolant is fed to the evaporative cooler 40 through the coolant inlet, flows around the vertical tubes 44 and exits again from the evaporative cooler 40 through the coolant outlet. Here, the coolant cools the tubes 44 and also vapor from the reactor 50 which is present therein. As a result, the vapor condenses and the condensed vapor flows back into the reactor 50.

One or more feed openings 46 are arranged in the cap 42 of the evaporative cooler 40. The feed openings 46 in the cap 42 of the evaporative cooler 40 serve for the introduction of materials, in particular components for producing the acrylate rubber, which contain, in particular, monomers, into the evaporative cooler 40. Furthermore, a plurality of nozzles 48 are provided in the cap 42 of the evaporative cooler 40. The nozzles 48 are connected to the feed openings 46. Materials which are introduced through the feed openings 46 into the cap 42 of the evaporative cooler 40 thus go to the nozzle 48 in the cap 42 of the evaporative cooler 40.

The nozzles 48 are arranged in the cap 42 of the evaporative cooler 40 in such a way that materials which are introduced through the feed openings 46 into the evaporative cooler 40 are distributed from above over the vertical tubes 44 of the evaporative cooler 40. The materials introduced through the feed openings 46 into the evaporative cooler 40 thus flow under the force of gravity into the vertical tubes 44 of the evaporative cooler 40, in which the vapor from the reactor 50 condenses.

A feed conduit 32 is connected to the cap 42 of the evaporative cooler 40. The feed conduit 32 serves for introducing materials into the evaporative cooler 40. The materials introduced into the evaporative cooler 40 via the feed conduit 32 include, in particular, components for producing the acrylate rubber, which contain, in particular, monomers. However, water can also be fed via the feed conduit 32 into the evaporative cooler 40.

The feed conduit 32 of the evaporative cooler 40 is connected to the feed openings 46 arranged in the cap 42 of the evaporative cooler 40. Materials which are introduced via the feed conduit 32 thus go through the feed openings 46 to the nozzles 48 in the cap 42 of the evaporative cooler 40 and from there into the vertical tubes 44.

The reactor 50 can be evacuated through the evaporative cooler 40 by means of a vacuum pump which is not shown here in order to generate a required subatmospheric pressure in the range from 150 mbar to 350 mbar in the reactor 50. A subatmospheric pressure conduit 35 is connected to the vacuum pump and is joined to a three-way valve 33.

The three-way valve 33 is on the one hand connected by means of a suction conduit 36 to the cap 42 of the evaporative cooler 40. The three-way valve 33 is also connected by means of a bypass conduit 34 to a lower region of the evaporative cooler 40, which region is arranged opposite the cap 42 and adjacent to the reactor 50.

Depending on the setting of the three-way valve 33, the reactor 50 can thus be evacuated by the vacuum pump via the suction conduit 36 and the subatmospheric pressure conduit 35 or via the bypass conduit 34 and the subatmospheric pressure conduit 35.

The feed conduit 32, the feed openings 46 and the nozzles 48 of the evaporative cooler 40 are arranged in the cap 42 in such a way that materials fed in are not sucked in and carried into the suction conduit 36 by the subatmospheric pressure generated by the vacuum pump.

At the beginning of the polymerization, in particular for producing acrylate rubber, water, an emulsifier and an initiator are firstly fed into the reactor 50 via the feed conduit 31. A component for producing acrylate rubber, which contains, in particular, butyl acrylate as monomer, can also be fed directly into the reactor 50 via the feed conduit 31. Likewise, a further monomer component as described above, for example the (poly)functional crosslinking monomer, can be fed directly into the reactor 50 via the feed conduit 31.

In the reactor 50, a polymerization of the monomers fed in, in particular an emulsion polymerization, takes place while stirring by means of the stirrer 52. Heat of reaction arises in the polymerization. The heat of reaction results in gaseous vapor ascending from the reactor 50 into the evaporative cooler 40. The gaseous vapor formed in the reactor 50 ascends in the vertical tubes 44 of the evaporative cooler 40 and is cooled there. As a result, the vapor condenses and the condensed vapor flows back into the reactor 50.

At least one component introduced via the feed conduit 32 into the evaporative cooler 40 contains butyl acrylate and is present in liquid form. A further component for producing acrylate rubber, which preferably contains a monomer having two double bonds, can additionally be introduced via the feed conduit 32 into the evaporative cooler 40.

Said materials are introduced via the feed openings 46 in the cap 42 of the evaporative cooler 40 into the evaporative cooler 40. The materials are distributed by means of the nozzles 48 in the cap 42 of the evaporative cooler 40 over the vertical tubes 44 of the evaporative cooler 40. Here, the materials flow from the top under the force of gravity into the vertical tubes 44 of the evaporative cooler 40.

Due to the heat of reaction which arises as a result of the polymerization in the reactor 50, gaseous vapor also ascends against the force of gravity from the reactor 50 into the vertical tubes 44 of the evaporative cooler 40. There, the vapor is cooled and condenses. Mixing of the condensed vapor with the materials which are introduced from above under the force of gravity into the vertical tubes 44 of the evaporative cooler 40 takes place. The condensed vapor subsequently flows together with the materials introduced into the evaporative cooler 40 under the force of gravity back into the reactor 50.

During the polymerization of the acrylates as described here, a reduced pressure compared to atmospheric pressure prevails in the reactor 50. The pressure within the reactor 50 is in the range from 150 mbar to 350 mbar, preferably from 200 mbar to 300 mbar, in particular about 250 mbar.

The process described here for polymerizing an acrylate is based on a discontinuous procedure. Water, emulsifier and initiator are firstly introduced via the feed conduit 31 into the reactor 50. After the required subatmospheric reaction pressure and the necessary reaction temperature have been attained, the introduction of the components containing monomers is commenced. The introduction of the components is effected, at least in the final phase of the polymerization, at least partly via the feed conduit 32 and the evaporative cooler 40. The polymerization commences in the reactor 50 shortly after commencement of the introduction of the required components. After the end of the introduction, the polymerization is continued until a conversion of the monomers of, at least approximately, 100% has been attained.

The acrylate rubber produced is, optionally after grafting, taken off in its entirety, and thus discontinuously, from the reactor 50, and thus also from the system 10 through the offtake conduit 38 after the polymerization in the reactor 50 is complete. After subsequent cleaning of the reactor 50, a further polymerization of an acrylate to produce acrylate rubber takes place as discontinuous process. Such a discontinuous process is also referred to as batch process or charge process.

The invention is explained further by means of the examples and claims.

In a process known from the prior art for producing acrylate rubber (based on butyl acrylate), the components are exclusively introduced directly into the reactor 50. The water is also introduced exclusively directly into the reactor 50. The acrylate rubber produced is taken off batchwise. After a number of months (e.g. 6-9 months) up to one year, so much polymer has been formed in the evaporative cooler 40 that removal of heat via the evaporative cooler 40 is hindered. There is frequently an operating time in the range from six months to one year.

In an experiment on the production of acrylate rubber (based on butyl acrylate) by means of the process of the invention in a system 10 according to the invention, the components are introduced directly into the reactor 50 only in the start-up phase and are subsequently introduced partly via the evaporative cooler 40. The water is exclusively introduced directly into the reactor 50. The acrylate rubber produced is taken off batchwise.

In the present case, it took over eighteen months until so much polymer had formed in the evaporative cooler 40 that the removal of heat by the evaporative cooler 40 had been significantly hindered. An operating time of over eighteen months was thus obtained.

In a further experiment on the production of acrylate rubber (based on butyl acrylate), the components are exclusively introduced directly into the reactor 50. However, the water is partly introduced via the evaporative cooler 40. The acrylate rubber produced is taken off batchwise.

In the present case, it took over fourteen months until so much polymer had been formed in the evaporative cooler 40 that the removal of heat by the evaporative cooler 40 had been significantly hindered. An operating time of over fourteen months was thus obtained. The operating time has thus been increased by at least two months.

The hindering of the removal of heat is made apparent, in particular, by a deterioration in the pressure control and a deterioration in the temperature control. The causes are usually a blockage in the tubes 44 of the evaporative cooler. As prophylaxis, appropriate monitoring can be carried out at regular intervals, for example every six months. For the purposes of such monitoring, the cap 42 of the evaporative cooler 40 is, for example, taken off and the tubes 44 of the evaporative cooler 40 are examined.

When the process known from the prior art is used for producing acrylate rubber, it is frequently the case that about 20% of the tubes 44 of the evaporative cooler 40 have blockages after a time of only from six to twelve months.

When the process of the invention is used for producing acrylate rubber, the tubes 44 have only a slight coating after a time of twelve months and only after a time of eighteen months do about 10% to 20% of the tubes 44 of the evaporative cooler 40 have blockages.

LIST OF REFERENCE NUMERALS

10 System
31 Feed conduit
32 Feed conduit
33 Three-way valve
34 Bypass conduit
35 Subatmospheric pressure conduit
36 Suction conduit
38 Offtake conduit
40 Evaporative cooler
42 Cap
44 Tube
46 Feed opening
48 Nozzle
50 Reactor
52 Stirrer

The invention claimed is:

1. A process for polymerizing acrylates by a reactor, where
heat of reaction arising in the reactor is removed by an evaporative cooler by feeding gaseous vapor formed in the reactor to the evaporative cooler and recirculating condensed vapor from the evaporative cooler to the reactor,
wherein at least one component containing acrylate is introduced at least partly via the evaporative cooler and goes via the evaporative cooler into the reactor,
wherein a reduced pressure is generated in the reactor,
wherein a reduced pressure compared to atmospheric pressure prevails in the reactor during the polymerization of the acrylate.

2. The process of claim 1, wherein the at least one component contains butyl acrylate.

3. The process of claim 1, wherein a further component containing a monomer having two double bonds is at least partly introduced into the evaporative cooler.

4. The process of claim 1, wherein the at least one component is at least partly introduced from above through a cap of the evaporative cooler.

5. The process of claim 1, wherein the at least one component is at least partly introduced from above into a plurality of vertical tubes of the evaporative cooler.

6. The process of claim 1, wherein the reactor is evacuated through the evaporative cooler by a vacuum pump via a subatmospheric pressure conduit.

7. The process of claim 1, wherein the polymerization of the acrylate is carried out as discontinuous process in the reactor.

8. The process of claim 1, wherein water is introduced into the evaporative cooler.

9. The process as claimed in claim 8, wherein the water is introduced at the same time as the at least one component.

10. The process of claim 8, wherein the water is introduced at a time after the at least one component.

11. The process of claim 1, wherein the at least one component is partly introduced directly into the reactor.

12. The process of claim 1, wherein a reduced pressure in the range from 150 mbar to 350 mbar is generated in the reactor.

13. A system for polymerizing acrylates, comprising
a reactor, and
an evaporative cooler for removing heat of reaction arising in the reactor,
wherein the evaporative cooler has at least one feed opening for introducing at least one component containing acrylate,
wherein the reactor can be evacuated through the evaporative cooler by a vacuum pump in order to generate a required subatmospheric pressure in the range from 150 mbar to 350 mbar in the reactor, where a subatmospheric pressure conduit is connected to the vacuum pump and is joined to a three-way valve and the three-way valve is connected by a suction conduit to a cap of the evaporative cooler and by a bypass conduit to a lower region of the evaporative cooler, which region is arranged opposite the cap and adjacent to the reactor.

14. The system of claim 13, wherein the at least one feed opening is arranged in a cap of the evaporative cooler.

15. The system of claim 14, wherein nozzles are arranged in the cap in such a way that the component introduced through the at least one feed opening is distributed from above over vertical tubes of the evaporative cooler.

16. The system of claim 13, wherein the reactor and the evaporative cooler are arranged in such a way that vapor formed in the reactor ascends against the force of gravity into the evaporative cooler and that vapor condensed in the evaporative cooler flows together with the at least one component under the force of gravity into the reactor.

* * * * *